US007340877B2

(12) United States Patent
Anderson et al.

(10) Patent No.: US 7,340,877 B2
(45) Date of Patent: Mar. 11, 2008

(54) CUTTER UNIT SUPPORT ROLLER

(75) Inventors: Steve K. Anderson, Plymouth, MN (US); Scott E. Freiberg, Champlin, MN (US)

(73) Assignee: CrossTech Manufacturing, Inc., Crosslake, MN (US)

( * ) Notice: Subject to any disclaimer, the term of this patent is extended or adjusted under 35 U.S.C. 154(b) by 0 days.

(21) Appl. No.: 11/013,812

(22) Filed: Dec. 16, 2004

(65) Prior Publication Data

US 2005/0166564 A1 Aug. 4, 2005

Related U.S. Application Data

(63) Continuation-in-part of application No. 10/247,779, filed on Sep. 19, 2002, now Pat. No. 6,832,466.

(60) Provisional application No. 60/323,239, filed on Sep. 19, 2001.

(51) Int. Cl.
*A01D 67/00* (2006.01)

(52) U.S. Cl. ................................. 56/320.1; 56/DIG. 3

(58) Field of Classification Search ...................... 56/1, 56/320.1, 320.2, DIG. 3, DIG. 10
See application file for complete search history.

(56) References Cited

U.S. PATENT DOCUMENTS 2,524,196 A * 10/1950 Hyman ........................ 56/364
3,369,350 A 2/1968 Rogers et al. ............... 56/25.4
3,462,925 A * 8/1969 Lanier ........................ 56/10.9
4,445,312 A * 5/1984 Cartner ....................... 56/15.5
4,903,465 A * 2/1990 Hughes ...................... 56/12.7
5,005,344 A 4/1991 McCracken ................. 56/14.7
5,435,117 A 7/1995 Eggena .................... 56/10.2 D
5,465,563 A * 11/1995 Heinz ......................... 56/17.2
5,706,638 A 1/1998 Kinder et al. ............ 56/10.2 E
5,791,132 A * 8/1998 Wiedenmann ............. 56/320.1
6,047,530 A * 4/2000 Bednar ............................ 56/6
6,484,481 B1 * 11/2002 Langworthy et al. ............ 56/6
6,588,191 B2 * 7/2003 Berndt et al. ................. 56/249

* cited by examiner

*Primary Examiner*—Thomas B. Will
*Assistant Examiner*—Alicia Torres
(74) *Attorney, Agent, or Firm*—Nawrocki, Rooney & Sivertson, P.A.

(57) ABSTRACT

A vegetation cutter to be mounted on a support vehicle for transport and deployment, has a housing with a rotating blade therein. The housing has a roller mounted for rotation forming the bottom edge of a side of the housing. The roller supports the cutter, allowing the cutter to slide along the ground when moved in a forward direction. When the support vehicle changes direction, the roller rotates, reducing the required force for turning the vehicle and cutter.

3 Claims, 9 Drawing Sheets

200
190
201
196
191
236
143
161
146
203
206 147 110 114 123 201 203
162

10
20
21
22
23
25
27
28
29
30
31
32
34
35
36
38
39
40
42
44
46
47
50
52
53
54
56
58
60
61
62
64,67
66
68
72

10
20
22
25
36
34
32
28
21
54
44
40
46
47
62
64,67
68
60
72
29
30
42
52
61
56
53
23
58
35
27
38
39
31
50

100
103
105
110
114
117
120
123
126
130
133
135
136
140
143
143a
146
147
150
153
156
160
162
163
166
167
173
176
179
180
182
183
184
185

101
11
13

CUTTER UNIT SUPPORT ROLLER

CROSS-REFERENCE TO RELATED APPLICATIONS

The present application is a continuation-in-part of application Ser. No. 10/247,779, filed Sep. 19, 2002 now U.S. Pat. No. 6,832,466 which is a regular application filed under 35 U.S.C. § 111(a) claiming priority, under 35 U.S.C. § 119(e)(1), of provisional application Ser. No. 60/323,239, previously filed Sep. 19, 2001 under 35 U.S.C. 111(b).

FIELD OF THE INVENTION

The present invention relates generally to the field of cutting and mulching equipment. More specifically, the present invention relates to improved usability and operator safety in the use of rotary brush cutters and mulchers.

BACKGROUND OF THE INVENTION

Cutting and mulching equipment is often used to cut away and/or clear vegetation such as tall grass, plants, weeds, shrubs, small trees, branches, and the like. A rotary brush cutter is one such device commonly used for clearing brush. Such a cutter has a blade that rotates in a plane generally parallel to the ground to cut brush at a more or less uniform height. The blade is enclosed in a housing that rolls on wheels or slides along the ground during operation.A brush cutter is typically mounted on the front of a tractor or skid loader (trade name: Bobcat) or other such carrier or support device or equipment. During operation, the brush cutter clears a path for the operator and the support device on which the brush cutter is mounted. These support devices usually have hydraulically operated arms extending to the front to which the brush cutter attaches and which can lift the brush cutter from the ground during transport, and lower the brush cutter to the ground during use.

A rotary brush cutter may pose a risk of injury to an operator. A common problem occurs where the rotating blade strikes and throws an object from the cutting area of the blade. The object may for example, be a twig, a rock, or any other object that may pose a risk to an operator. Injury can occur should such a thrown object hit an operator or bystander.

The danger increases when the brush cutter is lifted from the ground, say for transport, servicing, or cleaning. The blade is easily accessible when the cutter is lifted. If the cutter is still spinning, the blade poses an obvious danger to those nearby.

It is thus preferable that the brush cutter have a safety mechanism, such as an automatic blade shut-down mechanism, for when the brush cutter is raised above the ground.

One mechanism in the prior art involves a set of rollers positioned at a rear portion of a brush cutter. These rollers are heavy so that they maintain contact with the ground. If the brush cutter is lifted above a predetermined height, the rollers drop down with respect to the brush cutter housing and actuate the automatic shut-off mechanism. A problem with this apparatus is that the rollers may cause an unnecessary shut-off if the brush cutter travels over a hole or crevice area that causes the rollers to drop down to the predetermined shut-off distance.

A similar problem can occur when the brush cutter travels over a log. The rollers will drop down once they have rolled over the log, thus unnecessarily implementing operation of the shut-off mechanism.

Another problem with this mechanism is that it adds significant weight to the brush cutter, thus limiting the vast majority of cabs that can carry the weight of the shut-off mechanism.

Another mechanism in the prior art involves the use of an apparatus wherein a shut-off mechanism is initiated based on the difference between the height of the brush cutter with respect to the height of a cab. This apparatus includes a chain having a first end bolted to the brush cutter and a second end secured to a chassis of the cab, to thus limit the height to which the brush cutter can be lifted off of the ground with respect to the cab. A problem with this mechanism is that the brush cutter may be located over an inclined surface with respect to the cab, thus unnecessarily initiating the shut-off mechanism.

Another problem with these prior art mechanisms is that they lack shut-off devices that extend along the entire length of the side of the brush cutter to prevent debris from escaping through the sides of the brush cutter. Also, these mechanisms can become caught on the ground and other debris during operation, requiring the operator to shut down the machine and clean them off. Another problem with these mechanisms is that they are independent of the electrical mechanism, or motor, that runs the brush cutter. Thus, the safety mechanisms may be removed from the brush cutter without affecting operation. For example, the chain or rollers may be removed from the brush cutter and the brush cutter will still be able to operate, thus making the effectiveness of the safety mechanism moot.

The present invention provides for an improved brush cutter that addresses these shortcomings.

SUMMARY OF THE INVENTION

The present invention relates to improvements in safety features for a cutter unit such as a brush cutter. One version of the invention comprises a power-driven cutter unit carried by a separate vehicle and that is pushed along the ground by the vehicle to cut vegetation. The cutter unit is carried by at least one vertically movable lift arm forming a part of the vehicle. The lift arm has an attachment point that the vehicle can shift between a raised and a lowered position relative to the ground.

The cutter unit has a housing having forward and aft ends, a drive motor mounted on the housing, and a cutter blade within the housing and driven by the motor. The entire cutter unit has a transverse center of gravity, that is, a point between the front and the back of the cutter unit at which the cutter unit balances on the edge of a support extending transversely to the normal direction of movement.

The cutter unit further comprises a lifting bracket on the housing at a point spaced from the center of gravity. The lifting bracket is for connection to the attachment point on the lift arm to permit the cutter unit to rotate about a transverse axis relative to the lift arm. That is, the cutter unit mounting on the lift arm allows the cutter unit to rotate relative to the lift arm.

The cutter unit further has a shutoff control for the motor. The shutoff control has on and off states. The on state allows motor operation and the off state stops motor operation. An actuator element for the shutoff control has first and second positions for respectively selecting the on and off states of the shutoff control.

A linkage mounted for control by the lift arm connects operatively to the actuator element. The linkage moves the actuator element of the shutoff control to the first position responsive to a first angular position of the cutter unit relative to the lift arm. The linkage moves the actuator element to the second position responsive to a second angular position of the cutter unit relative to the lift arm.

In a typical case, the first angular position of the cutter unit relative to the lift arm corresponds to the situation where the cutter unit rests on or is close to the ground and the motor is operating to spin the blade. The second angular position of the cutter unit corresponds to the situation where the cutter unit is lifted from the ground. In the second angular position the motor is stopped so the blade doesn't spin, thus avoiding danger from an exposed spinning blade.

In a further embodiment of the invention, at least a portion of the housing comprises a roller mounted along at least one side of the cutter unit near the bottom of the drive assembly and rotating about an axis extending from the front to the rear of the cutter unit, that is substantially along the travel axis. As the support vehicle turns from a straight line path, the cutter unit shifts laterally. The roller rotates during such turns, dramatically reducing the force resisting turning and improving the ability to steer during turns. Preferred embodiments have a roller extending along at least a portion of each side of the cutter unit. Each roller will normally have a length along the axis at least equal to the maximum diameter of the roller.

In a preferred embodiment, the roller on each side is tapered at the front end at least. The taper may take form of one or more conical features. The roller need not have any surfaces parallel with the axis of rotation, but instead may taper along the entire length.

DETAILED DESCRIPTION OF THE PREFERRED EMBODIMENTS

Figure 1:
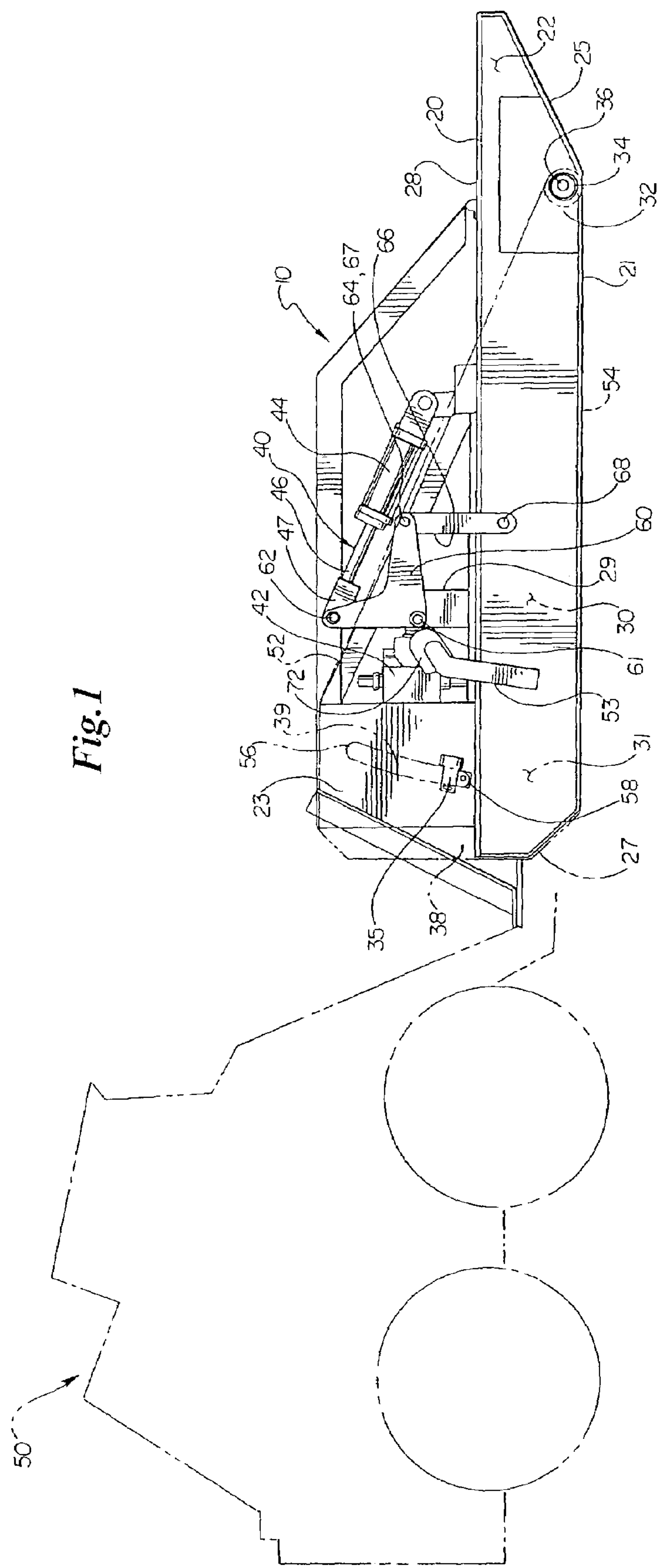
FIG. 1 is a side view of the present invention in a first configuration.
Figure 2:
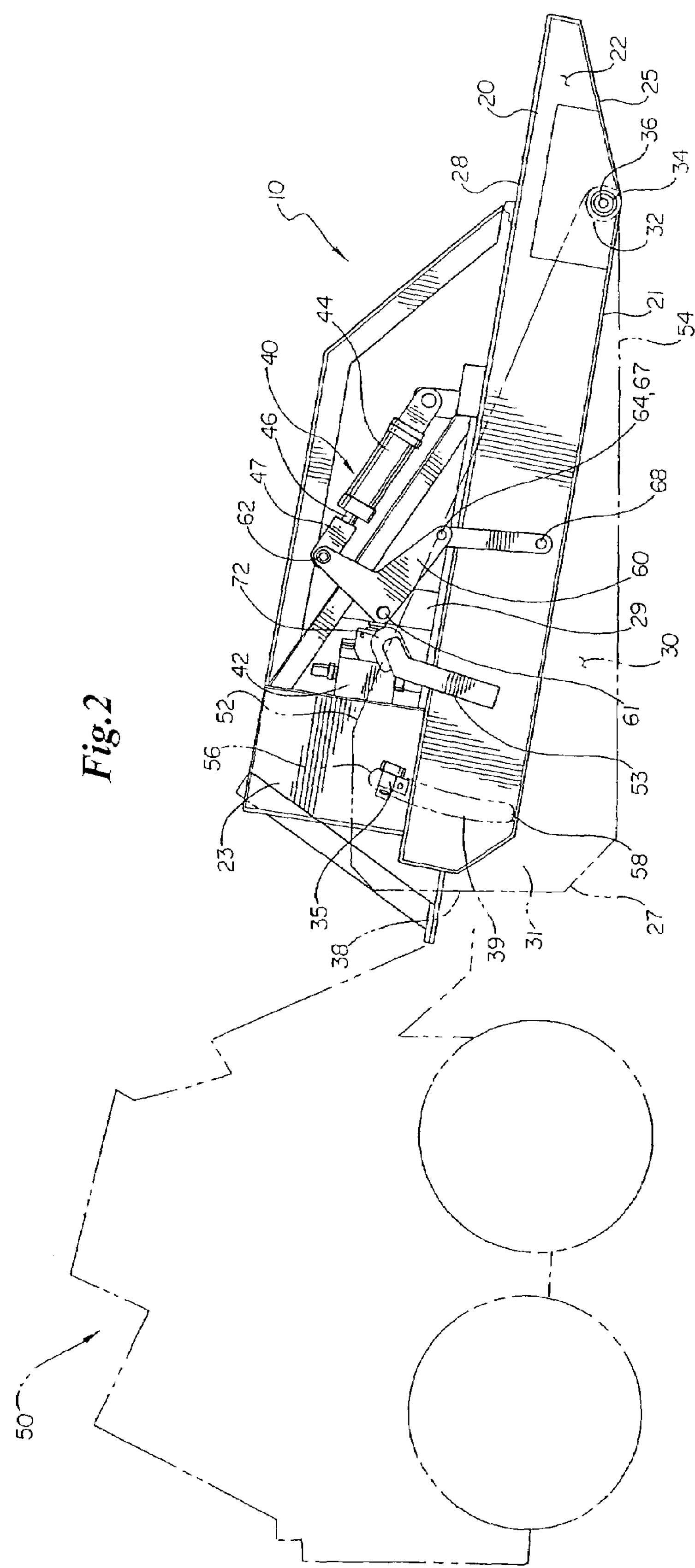
FIG. 2 is a side view of the invention from FIG. 1 in a second configuration.
Figure 3:
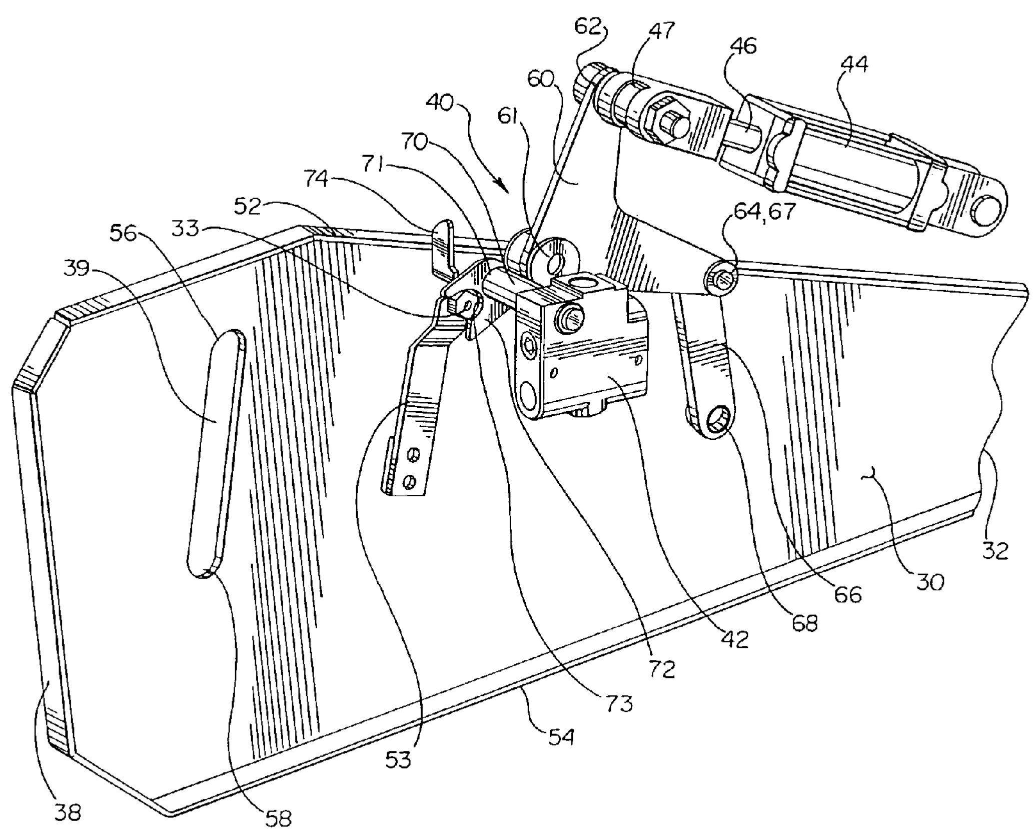
FIG. 3 is a perspective view of the present invention with some parts cut away.
Figure 4:
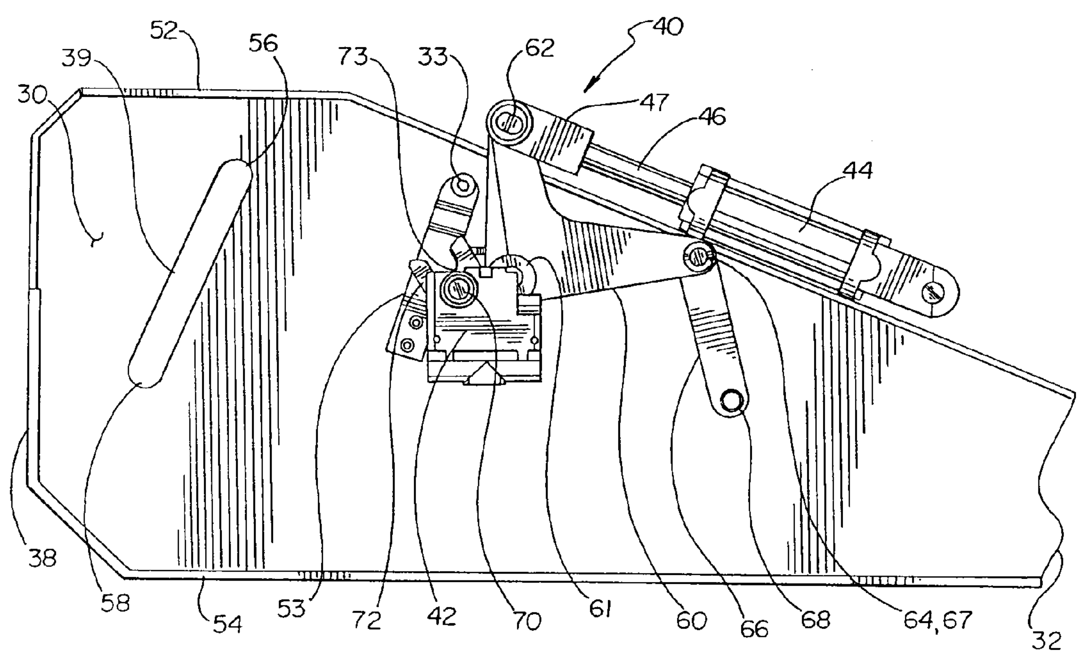
FIG. 4 is a side view of the present invention in the first configuration with some parts cut away.
Figure 5:
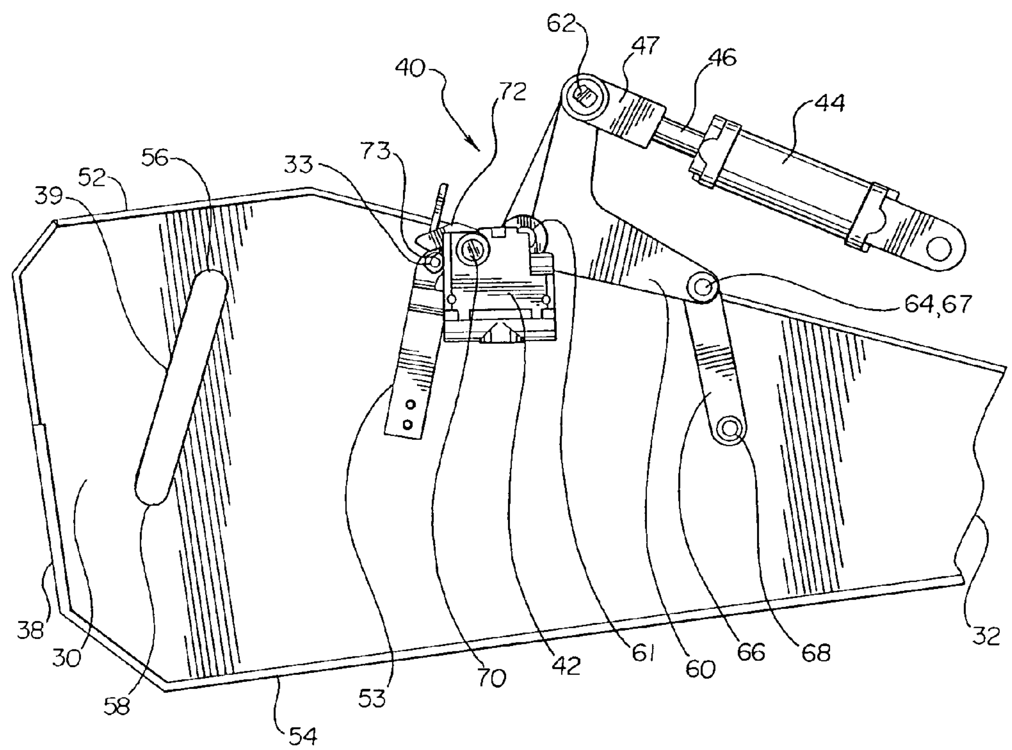
FIG. 5 is a side view of the present invention in the second configuration with some parts cut away.
Figure 6:
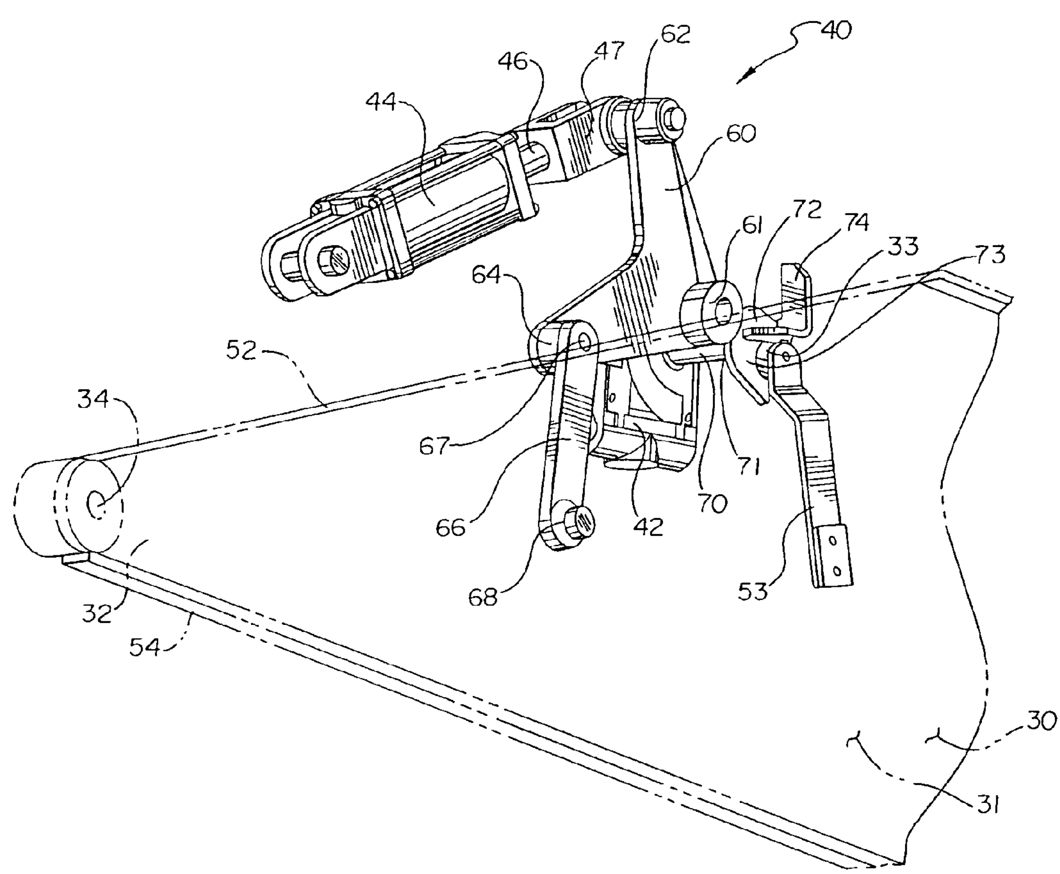
FIG. 6 is a perspective view of the present invention with some parts cut away.

FIGS. 1 and 2 illustrate one embodiment of the present invention. A brush cutter attachment 10 is shown attached to the front of a cab 50. The brush cutter attachment 10 may be used to cut brush such as plants, grass, weeds, branches and the like. The cab 50 provides means for an operator to steer and advance the brush cutter attachment 10 over a surface to be cleared by the attachment 10.

The brush cutter attachment 10 is shown as having a housing 20 and a side panel 30 moveably secured to the housing 20 in a pivotal fashion. A biasing assembly 40 extends from the housing 20 to the side panel 30 urging the side panel 30 downwardly with respect to the housing 20.

The attachment 10 is operated by a motor. A shut-off valve 42 is mounted to the housing 20 and is activated to shut off the motor when the side panel 30 extends downwardly a predetermined distance with respect to the housing 20. As shown in FIG. 1, the side panel 30 is biased to contact the cutting surface as the housing 20 travels over the surface. In this illustration, operation of the shut-off 42 valve will not occur and the motor will continue to operate.

As shown in FIG. 2, the housing 20 may be movable a predetermined distance above the surface to be cleared. This will render the side panel 30 extending downwardly a predetermined distance relative to the housing 20, thus initiating the shut-off valve 42 and shutting off the motor.

The housing 20 has a pair of sidewalls 22, a front wall 24, a rear wall 26, and a cover 28, for housing a cutting blade. The cutting blade rotates about a shaft extending through the cover 28 toward the cutting surface. The blade rotates, it is intended, substantially parallel to the cutting surface at a predetermined height above that surface. The cutting blade is rotated by the motor. The motor is mounted on a top portion of the housing cover 28, within a motor casing.

The side panel 30 is moveably secured to the housing 20. The side panel 20 is biased downwardly with respect to the housing 20 for preventing debris from projecting from beneath the housing 20 and possibly causing injury to the operator or to a bystander. The side panel may 30 extend along the entire fore-and-aft length of the brush cutter 10.

The side panel 30 is, at a front location 32, pivotally connected to the housing 20. The front portion 32 has an aperture 34 for pivotally securing the side panel 30 to the housing 20. A locking bolt 36 may be extended through the aperture 34 to maintain the side panel 30 adjacent the housing 20. A neck 37 of the bolt 36 may extend through the aperture 34 and into a securing portion of the housing 20. The head of the bolt 36 may extend to an outer surface 31 of the side panel 30 for maintaining the side panel 30 adjacent to the housing 20.

The side panel 30 has a back portion 38 that pivots about the aperture 34. The back portion 38 has an arcuate slot 39 for receiving a guide member 35. The guide member 35 extends from the housing 20 and through the slot 39. The guide member 35 may have a head that extends through to an outer side 31 of the side panel 30. The head portion may be wider than the slot 39 to maintain the side panel 30 adjacent the housing 20. The slot 39 may have a radius of curvature for allowing the side panel 30 to pivot. The side panel 30 is able to pivot about the locking bolt 36 until the guide member 35 contacts an upper limit or lower limit of the slot 39.

The panel 30 has a top side 52 and a bottom side 54. The top side 52 may converge toward the bottom side 54 as it progresses toward the front 32 of the side panel 30. A substantial length of the bottom side 54 of the side panel 30 is linear for contacting the cutting surface.

In operation, as the brush cutter 10 is advanced over a surface, the side panel can pivot about the locking bolt 36. For example, if the housing 20 is substantially close to the cutting surface, the side panel 30 will be centered such that the guide member 35 is spaced from the upper limit 56 and lower limit 58 of the slot 39. If the housing 20 becomes raised above the cutting surface, the side panel 30 moves downwardly toward the cutting surface such that the guide member 35 becomes located at the upper limit 56 of the slot 39 and the bottom side 54 of the side panel 20 extends below a lower portion 21 of the housing 20.

The housing 20 has a cover panel 28 and a pair of sidewalls 22 for housing the cutting blade. The housing 20 has a front portion 25 that is angled upwardly with respect to the lower portion 21 of the housing 20. The front portion 25 allows for brush to be received within the housing 20 in order to be cut by the blades. The housing 20 has a rear portion 27 for connection to the cab 50. By connecting to the cab 50, the housing 20 may be directed over the cutting surface by the operator of the cab 50. A motor used for rotating the blade may also be connected to, and operable from, the cab 50. The motor provides a torque force to a blade shaft for rotating the blade.

FIGS. 3 through 6 illustrate a biasing mechanism 40 mounted for biasing the side panel 30 downwardly with respect to the housing 20. A shut-off valve 42 is also secured to the housing 20. The shut-off valve 42 works in tandem with the biasing mechanism 40 such that, when the side panel 30 is fully extended downwardly, the shut-off valve 42 will be switched so as to shut-off the motor to the rotatable blade, thus stopping the blade from being rotated and preventing possible injury to the operator.

Turning now to FIGS. 3-6, the biasing mechanism 40 includes a cylinder 44 and piston 46 assembly secured to the top portion 28 of the housing 20. The cylinder 44 and piston 46 assembly may be hydraulic, as shown. The piston 46 has a working end 47 pivotally connected to a first end 62 of a bell crank 60. A second end 64 of the bell crank 60 is pivotally attached to the side panel 30 via a connecting arm 66. The connecting arm 66 has a first end 67 pivotally connected to the second end 64 of the bell crank 60 and a second end 68 pivotally connected to the side panel 30. The bell crank 60 has an elbow 61 that is pivotally secured to the housing 20. As shown, the elbow 61 is pivotally connected to a mounting member 29 extending from the top portion 28 of the housing 20. The elbow 61 is positioned proximate the shut-off valve 42.

The shut-off valve 42 is secured to a motor casing 23 extending above a top portion 28 of the housing 20. The shut-off valve 42 has a rotatable shaft 70 extending in a direction toward the side panel 30. The shaft 70 has a first end 71 for receiving a pin 33 extending from the side panel 30. A yoke 72 is positioned at the first end 71 for engaging the pin 33 such that, as the pin 33 is received within the yoke 72, the shaft 70 will be rotated so as to initiate action by the shut-off valve 42 and shut-off the motor by shutting off the hydraulics to the motor.

The shaft 70 has a lift limit switch 74 that will rotate with the shaft 70 such that, when the shaft 70 is rotated, the limit switch 74 will extend upwardly.

The shut-off valve 42 may have a timer such that the valve 42 may be rotated for a predetermined period of time before the shut-off valve 42 initiates shutting down the motor. Thus, if the yoke 72 is removed from a position receiving the pin 33 prior to reaching the predetermined period of time, the motor will not be shut off.

The side panel 30 has a bracket 53 for mounting the pin 33 to the side panel 30. The pin 33 extends inwardly from the side panel 30 for engaging the first end 71 of the shaft 70. More specifically, the pin 33 extends from an inner portion of the side panel 30 for engaging the receiving portion 73 of the yoke 72. The bracket 53 may be adjusted to change the height to which the housing 20 must be raised with respect to the side panel 30 to operate the shut-off valve 42.

In operation, the motor will rotate the blade and the operator may steer the cab 50 over a cutting surface. As the brush cutter 10 travels over the cutting surface, the piston 46 is biased in the direction of the cylinder 44, thus biasing the side panel 30 downwardly with respect to the housing 20 and towards the cutting surface. Elbow 61 pivots to extend the connecting arm 66 downwardly toward the cutting surface. The side panel 30 is able to pivot about the front portion 32 locking bolt 36 and move upwardly and downwardly with respect to the housing 20 as the brush cutter 10 moves over ground.

When the housing 20 is lifted a predetermined distance above the cutting surface, the side panel 30 will extend downwardly such that the engaging pin 33 will engage the yoke 72 at the first end 71 of the shaft 70 of the shut-off valve 42. The engaged yoke 72 will cause the shaft 70 to rotate, initiating the shut-off valve 42 to shut-off the hydraulics to the motor, and thus shutting down the blade from rotating. The lift limit switch 74 extends upwardly from the housing.

The operator may restart the motor by returning the brush cutter 10 to a height above the cutting surface that does not initiate the shut-off valve 42.

Figures 7, 8, 9:
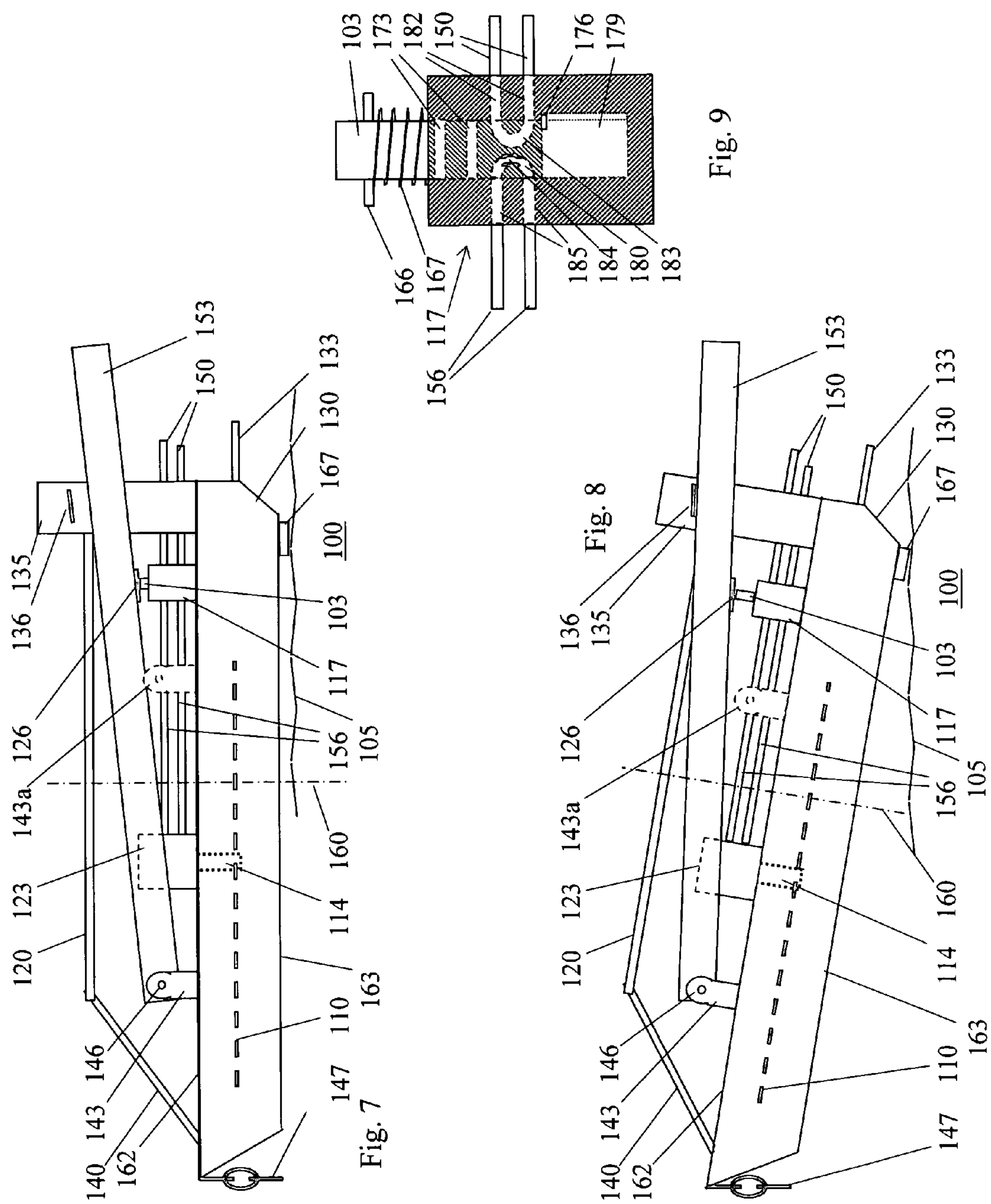
FIGS. 7 and 8 are respectively, lowered and raised side elevation views of a brush cutter with a generic blade shutoff mechanism.
FIG. 9 is a schematic section view of a hydraulic control valve for controlling flow of hydraulic fluid to the blade motor.

FIGS. 7 and 8 are side elevation views of a further type of cutter unit 100 for cutting vegetation such as brush. Cutter unit 100 is designed for use as an accessory for utility vehicles such as skid loaders that have lift arms 153 having a compatible interface for connecting to a variety of accessories such as buckets, excavating shovels, backhoes, and jackhammers. The interface shown in FIGS.7 and 8 is generic rather than standardized, but is useful for illustrating the invention. Whatever interface standard is involved will define the spacing between the arms 153, accessory attachment specifications, etc. In addition, the utility vehicle will usually provide operating power for cutter unit 100, typically either hydraulic or electrical.

FIG. 7 shows cutter unit 100 in the operating position just above and approximately parallel to ground level shown at 105. FIG. 8 shows cutter unit 100 in a raised or elevated position above ground level 105. Cutter unit 100 can be considered to have a travel axis in the plane of and horizontal in FIGS. 7 and 8. During operation for clearing ground, the utility vehicle moves cutter unit 100 along the travel axis to chop and chip brush and other vegetation within the path of cutter unit 100.

Cutter unit 100 includes a housing 130 having a deck 162 on which a drive motor 123 is mounted. Drive motor 123 has a downwardly projecting shaft 114 that a motor 123 rotates at high speed. A blade 110 is mounted for rotation on shaft 114. In some versions shaft 114 and blade 110 are driven by motor 123 through a gear unit such as a right angle drive also mounted on deck 162. In most cases, the utility vehicle deploying cutter unit 100 powers motor 123.

Housing 130 has a pair of sidewalls 163 for preventing debris from being driven by blade 110 sideways from housing 130. FIGS. 7 and 8 show only a single sidewall in the foreground. As shown previously, sidewall 163 may rotate around a forwardly located, transverse axis pivot to closely enclose the space around blade 110 when unevenness in ground level 105 may otherwise allow space to appear between the bottom edge of sidewall 163 and ground level 105.

Each sidewall 130 may have a roller 167 at the forward, aft, or both ends thereof. Each roller 167 has an axis of rotation aligned with the travel axis so that as the utility vehicle changes direction, cutter unit 100 provides little resistance to such turns. Roller 167 may be tapered from front to rear to allow roller 160 to slide or skid smoothly over the ground surface 105.

A chain curtain 147 suspended from a forward end of housing 130 prevents debris from being driven by blade 110 forward from housing 130. Only a single set of links is shown in FIGS. 7 and 8 for curtain 147. The chain curtain 147 may be formed from as many as 40-50 link sets. A deflector plate 133 prevents debris from being thrown upwards from the aft end of housing 130. A chain curtain may also be used instead of a deflector plate. 133

Cutter unit 100 includes a back plate 135 that supports an aft end of a top drive guard 120. A front drive guard 140 is connected to the forward end of top drive guard 120 and to the forward area of deck 162. Guards 120 and 140 collectively serve to protect drive motor 123 during use. Guards 120 and 140 should be removable to allow access to drive motor 123 and other adjacent components.

Cutter unit 100 further has a transverse center of gravity whose position is indicated by dashed line 160. Cutter unit 100 when suspended at line 160 will more or less balance fore and aft to maintain approximately the level position shown in FIG. 7.

Cutter unit 100 includes a pair of lifting brackets 143 firmly attached to deck 162, although FIGS. 7 and 8 show only a single bracket 143. Brackets 143 are attached to deck 162 outboard of back plate 135 and top drive guard 120 at points allowing lift arms 153 to connect to brackets 143. Brackets 143 also meet the utility vehicle's accessory attachment specifications to allow arms 153 to attach to brackets 143 with pins 146. Cutter unit 100 is attached to brackets 143 with pins 146 to rotate or swivel with respect to arms 153.

Brackets 143 are attached to deck 162 at a point spaced forward from center of gravity line 160. When arms 153 lift cutter unit 100 from the position shown in FIG. 7 to the position shown in FIG. 8, the spacing of brackets 143 from center of gravity line 160 causes cutter unit 100 to rotate clockwise under the influence of gravity. A stop 136 on back plate 135 rests on arm 153 to support cutter unit 100 in the angular attitude shown in FIG. 8.

Alternatively brackets 143 may be positioned aft or behind the center of gravity line 160 in the position shown as phantom bracket 143*a*. This position requires substantial redesign from that shown in FIGS. 7 and 8 to incorporate the desired safety features.

A preferred version of cutter unit 100 uses a drive motor 123 operating hydraulically. Pressurized hydraulic fluid from a hydraulic pump in the utility vehicle is provided on and returns on hydraulic source hoses 150. A diverter valve 117 functioning as a shutoff control receives hydraulic fluid from the utility vehicle and controls flow of the pressurized hydraulic fluid to motor 123 in hoses 156. Valve 117 has an on state allowing pressurized hydraulic fluid from hoses 150 to flow in motor hoses 156 to and from motor 123. Valve 117 also has an off state where the pressurized hydraulic fluid from hoses 150 is diverted to flow through valve 117 back on one of the hoses 150 to the hydraulic pump.

The state of valve 117 is controlled by an actuator element 103 that is in turn controlled by lift arm 153. In the simple embodiment of FIGS. 7 and 8, a valve operator 126 carried on an arm 153 serves as a feature for controlling the state of valve 117. Operator 126 position is determined by the angular position of cutter unit 100 relative to arms 153.

FIG. 7 shows actuator element 103 in a first position allowing pressurized hydraulic fluid to flow to and from motor 123 through valve 117. FIG. 8 shows element 103 in a second position where hydraulic fluid flows through valve 117 and directly back to the hydraulic pump.

One can see as arms 153 start to lift cutter unit 100 from the position shown in FIG. 7 to that in FIG. 8, cutter unit 100 rotates clockwise relative to both ground surface 105 and arms 153. Valve operator 103 shifts from the position of FIG. 7 to the position of FIG. 8. When this transition is complete, flow of pressurized hydraulic fluid is diverted back to the pump. Motor 123, receiving no pressurized hydraulic fluid, slows and stops.

A simplified version of valve 117 is shown in more detail in FIG. 9. Valve 117 has a pair of inlet ducts 182 receiving pressurized hydraulic fluid from hoses 150 and a pair of outlet ducts for supplying pressurized hydraulic fluid to motor 123.

Actuator element 103 is shown as a plunger or piston having a pair of feed-through ducts 173 and a diverter duct 183. Actuator element 103 has a helical compression spring 167 acting between a pin 166 and the valve 117 housing that urges element 103 into the position shown in FIG. 9. An internal stop 176 positions element 103 in the diverter position shown in FIG. 9 against the force of spring 167 when no force is applied to actuator element 103.

When actuator element 103 is pressed into cavity 179, ducts 173 carry pressurized hydraulic fluid to outlet ducts 185 and motor hoses 156. This position corresponds to that of FIG. 7. Motor 123 then can drive blade 110.

When plunger 103 is in the position shown in FIG. 9, pressurized fluid in hoses 150 is directed through diverter duct 183 and does not reach outlet ducts 185. The position valve 117 is shown as having in FIG. 9 corresponds to the valve state in FIG. 8.

The momentum carried by a rapidly rotating blade 110 may cause a problem during motor 123 shutdown. The momentum of blade 110 cannot be easily dissipated in motor 123 and the hydraulic hoses 156 that provide fluid to motor 123.

Valve 117 in FIG. 9 provides a soft stop modality allowing blade 10 to slow down over a period of a few seconds without applying shock to the hydraulic system. Plunger 103 includes a diverter duct 180 that when plunger 103 is in the off position, receives hydraulic fluid pumped by motor 123 arising from rotational inertia in blade 110. Diverter duct 180 includes a flow restrictor 184 that opposes flow of hydraulic fluid pumped by motor 123 resulting from momentum in blade 110. Properly selecting the dimensions of flow restrictor 184 provides a soft stop modality for motor 123.

Because the hydraulic fluid pump is constantly operating, a pressure relief valve should be provided to temporarily divert pressurized hydraulic fluid from valve 117 to prevent damage to components receiving the high pressure hydraulic fluid.

Figures 10, 11, 12:
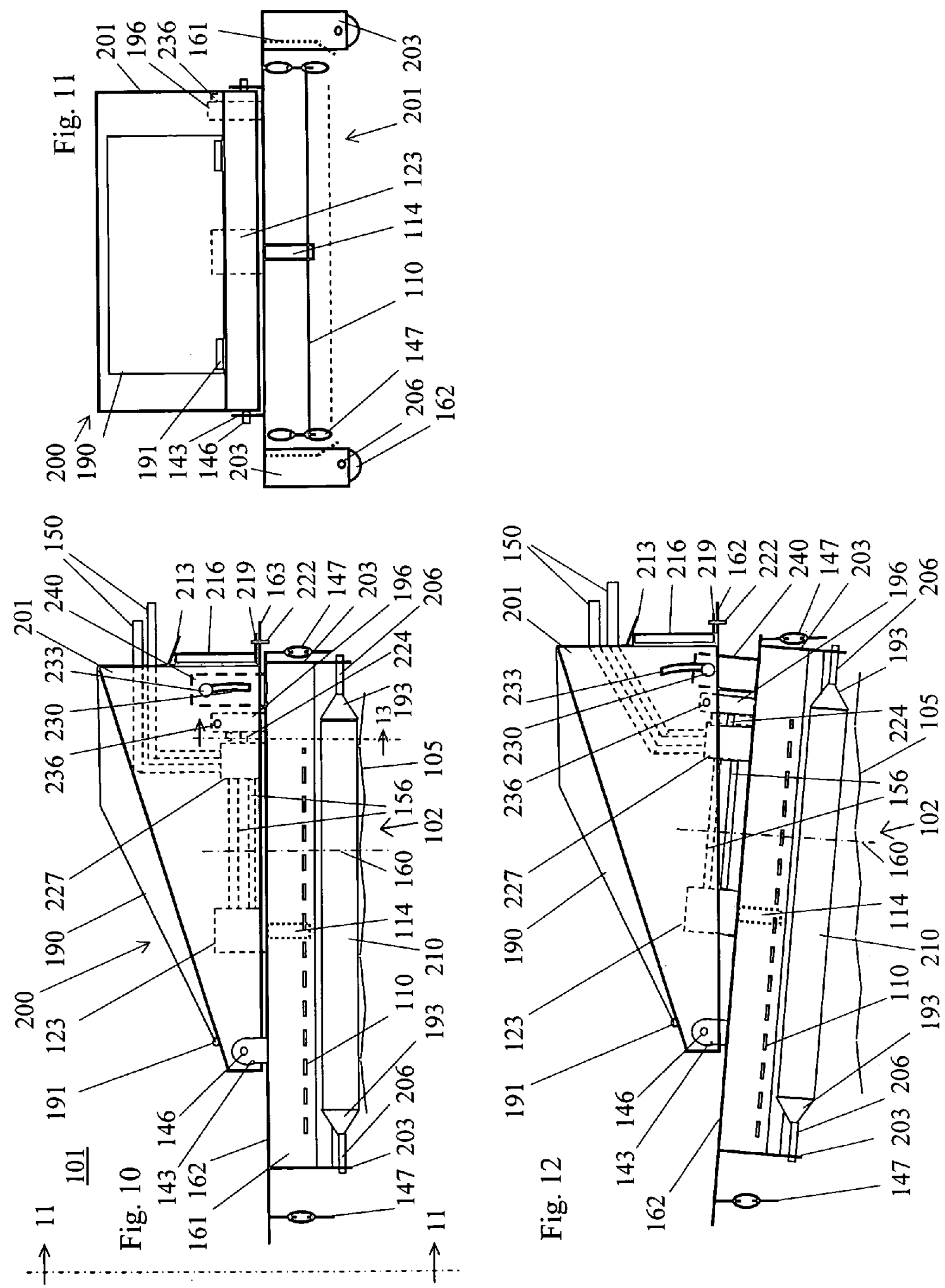
FIGS. 10 and 12 are respectively, lowered and raised side elevation views of a brush cutter with a standard connection interface to the carrier device.
FIG. 11 is a front elevation view of the brush cutter as shown in FIG. 10.

FIGS. 10-13 show details of a commercial embodiment for a cutter unit 101. Components shown in FIGS. 10-13 having similar functions to components of the embodiment shown in FIGS. 7-9 have the same reference numbers. FIG. 10 shows cutter unit 101 deployed for use, resting on the ground surface represented symbolically at 105.

Generally, the cutter unit 101 of FIGS. 10-13 includes a drive assembly 102 and a support bracket 200. Drive assembly 102 has a center of gravity or balance point indicated by the dot-dash line 160. When placed on a transverse (perpendicular to the paper as shown in FIGS. 10 and 12) edge aligned with line 160, drive assembly 102 will very nearly balance fore and aft, i.e., front and rear.

The support bracket 200 design matches a standard utility vehicle attachment interface commonly incorporated in the lift arms of utility vehicles. In FIGS. 10 and 12, the forward or leading end of cutter unit 101 is to the left. A portion of the utility vehicle attachment interface is shown at the right of support bracket 200.

FIGS. 10 and 12 show the vehicle attachment interface as having a vertical support bar 216 shown on edge in FIGS. 10 and 12 and typically extending across a substantial portion of the width shown in FIG. 11 of support bracket 200. A lock plate 219 projects horizontally aft from the lower edge of bar 216. The utility vehicle's arms attach to support bar 216 in a way allowing bar 216 to be raised, lowered, and rotated in either direction under control of the vehicle's operator. These features are all very well known in the industry.

Support bracket 200 has the matching interface components. These include an interface bracket 213 angling downwardly from support bracket 200 and welded firmly to support bracket 200. Bracket 213 may extend as a single component across the width of bracket 200 or may instead comprise two or more spaced aft-projecting tabs. Since interface bracket 213 supports the entire weight of a cutter unit 101 that typically weighs several hundred pounds and is cantilevered from the support bar 216, interface bracket must be sturdy and strongly attached to support bracket 200.

A retainer bracket 163 projects horizontally from the rear of support bracket 200 at a point just below lock plate 219. At least one pin or nut/bolt combination 222 is passed through aligned holes in retainer bracket 163 and lock plate to secure cutter unit 222 to the vehicle attachment interface.

Support bracket 200, the bracket 200 interface components 213 and 163, the vehicle interface components 216 and 219, and the lift arms on the utility vehicle to which components 216 and 129 attach, are the functional equivalent of the arms 153 shown in FIGS. 7-8 even though not having the same structural configuration.

Drive assembly 102 has as major components, a deck 162 and a drive motor 123 with a shaft 114 supporting a blade 110, similar to that shown in FIGS. 7-8. Support bracket 200 attaches to drive assembly 102 at two swivel points along a single axis. Each swivel point comprises a bracket 143 projecting upwards from deck 162 and a swivel pin 146 that makes the actual connection between drive assembly 102 and support bracket 200.

Support bracket 200 includes two sidewalls 201 that provide the major stiffness for bracket 200. In general, bracket 200 forms a shroud or cover that protects the drive assembly 102 components such as motor 123. An access door 190 forms much of the top surface of bracket 200. Door 190 attaches to bracket 200 by hinges 191 shown in FIGS. 10-12.

For protection against flying debris, the front and back of the blade 110 area has chain curtains formed of a number of shorts lengths of chain segments 147. The dotted line in FIG. 11 between two chain segments 147 indicates that the entire space along the dotted line is filled with chain segments 147.

The sides of the blade 110 area have two different types of protection against debris ejection. To protect the areas relatively close to deck 162, relatively short (top to bottom) panels 161 enclose the blade 110 area on each side from deck 162 downward to below the plane of blade 110. Preferably, a panel 161 has an inwardly-directed bend as shown most clearly in FIG. 11 that extends downward to approximately the axis of rotation for a roller 210.

Longitudinal roller 210 extends a substantial distance along each side of drive assembly 102 and just outboard from panel 161. Because the rear of drive unit 102 lifts from the ground 105 last, roller 210 should perhaps be positioned closer to the rear of drive assembly 102 that to the front if the roller does not extend along the entire side of drive assembly 102.

Each roller 210 has at each end, a projecting shaft 206 that is mounted for rotation in a bracket 203. Preferably, each roller 210 has tapered ends 193. If roller 210 is quite short relative to the entire front to rear length of the blade 110 area, panel 161 can extend downwardly to a point at or slightly past shaft 206. Many other configurations are possible for enclosing the sides of the blade 110 area.

Rollers 210 provide substantially for improved turning of the vehicle carrying cutter unit 101 when cutter unit 101 is in the operating position resting on the ground surface 105, as shown in FIG. 10. As mentioned, cutter unit 101 is quite heavy. Experience shows that the lower side edges of cutter unit 101 tend to catch and drag on ground surface 105 as the utility vehicle changes direction. This places substantial strain on the attachment interface, cutter unit 101, and the utility vehicle arms themselves.

Rollers 210 rotate when the vehicle turns allowing cutter unit 101 to smoothly ride over and above small irregularities in the ground surface 105 below blade 110 and adjacent to the sides of cutter unit 101. During straight-line movement, the tapered ends 193 improve the ability of rollers 210 to slip or skid relatively smoothly on the ground surface 105 with little catching or digging. Further, the tendency of rollers 210 to rotate naturally during use distributes wear and abrasion evenly around the entire roller 210 periphery, leading to improved life relative to a simple skid element.

The term "roller" in this context means a cylindrical element mounted for rotation and supported by deck 162. The total length of such a roller 210 between the ends of the tapered ends 193 is greater than the maximum diameter of roller 210, and preferably at least 1 ft. (0.3 m.). The included angle of the wall apex of a tapered end 193 should typically be less than 90° and preferably less than 60°, to allow each roller 210 to smoothly skid over the ground during straight line motion. A preferred roller 210 may be at least 4 in. (10 cm.) in diameter. For a cutter unit 101 having a lifting bracket 143 forward of the center of gravity line 160, at least a portion of roller 210 should be near to the rear or aft portion of drive assembly 102.

Figure 15:
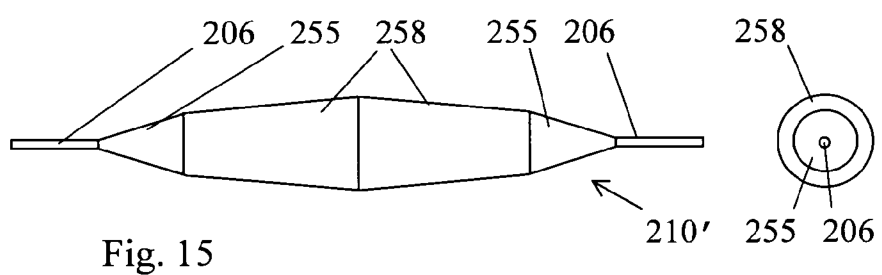
FIG. 15 shows side and end elevation views of an alternative design for a side roller.

FIG. 15 shows a variation for roller 210 that provides for easy turning of the support vehicle and easy sliding of the brush cutter unit 200.

Of course, the utility vehicle must lift cutter unit 101 from ground surface 105 frequently for transport, clearing jams of debris, etc. The design of the cutter unit 101 lifting mechanism cooperates with a unique safety shutoff feature and allows easy access to the blade 110 area as well.

The lifting of cutter unit 101 clear of ground surface 105 activates structure incorporated in support bracket 200 and drive assembly 102 to stop blade 110 rotation. As the utility vehicle's lift arms raise the cutter unit 101, drive assembly 102 rotates a few degrees clockwise relative to bracket 200 as viewed from the left side shown in FIGS. 10 and 12.

Each side wall 201 has a slot 230 near the side wall 201 aft end. Slot 230 is preferably a circular arc centered on pin 146. A bracket 240 is firmly attached to deck 162 by welding for example, and in transverse alignment with slot 230. A support pin 233 attached to bracket 240 projects through slot 230. Pin 233 should have a head as shown to prevent pin 233 from disengaging from slot 230 during normal use. Bracket 240 and pin 233 must be sufficiently strong to support the weight of a substantial percentage of drive assembly 102.

When the utility vehicle arms raise support bar 216, drive assembly 102 rotates clockwise relative to support bracket 200 until pin 233 reaches the bottom of slot 230. The relative rotation then stops, and the entire cutter unit 101 rises above ground surface 105 as shown in FIG. 12. In this position, blade 110 and the area around blade 110 can be easily accessed for service and cleaning.

During operation, blade 110 turns at high speed and is driven by the powerful motor 123. When cutter unit 101 is in the lifted position shown in FIG. 12, blade 110 must not rotate. A safety mechanism incorporated in cutter unit 101 stops blade 110 rotation responsive to lifting of cutter unit 101.

In one commercial embodiment, motor 123 is driven hydraulically. Other designs might drive motor 123 electrically or mechanically from an internal combustion engine. In any case, the drive power is supplied from some type of power source, such as a hydraulic pump, electrical generator or battery, or fuel tank.

In the embodiment of FIGS. 10-12, a motor 123 shutoff control includes a main motor valve 227 controlling flow of pressurized hydraulic fluid to hydraulic drive motor 123. A pump forming a part of the utility vehicle supplies pressurized fluid to valve 227 through hoses 150. One hose 150 carries the pressurized fluid from the pump, and the other returns the fluid to the pump. Hoses 156 carry the hydraulic between valve 227 and motor 123. Valve 227 may easily be replaced with an electrical switch or a fuel valve.

Figure 13:
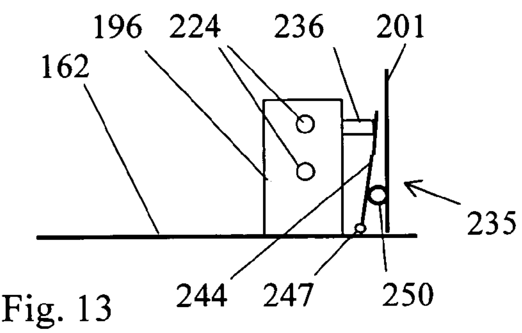
FIGS. 13 and 14 show details of the hydraulic valve actuation mechanism.
Figure 14:
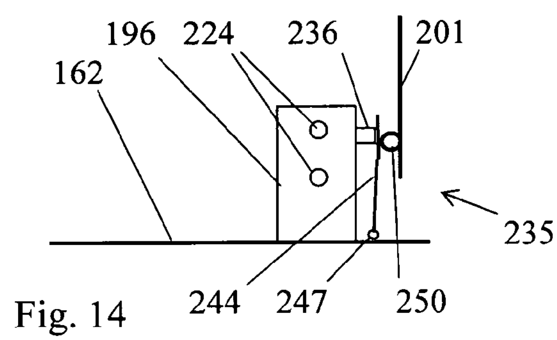

Main motor valve 227 opens and closes responsive to the status of a control valve 196 that forms another part of the shutoff control. FIGS. 13 and 14 are front elevation views of the shutoff control and the interface with the drive assembly 102 and support bracket 200.

Referring to FIGS. 10 and 12-14, valve 196 connects to valve 227 through a pair of control fluid hoses 224. A first pressure difference between hoses 224 opens motor valve 227. A second pressure difference between hoses 224 closes motor valve 227. The position of a control element shown as plunger 236 determines the pressure difference in hoses 224.

FIG. 13 shows a first position for plunger 236 extending from the body of valve 196, causing valve 196 to hold motor valve 227 open allowing fluid to flow to motor 123. FIG. 14 shows a second position for plunger 236 pressed into the body of valve 196, causing valve 196 to hold motor valve 227 closed and block fluid flow to motor 123. A spring, not show, biases plunger 236 to the extended position of FIG. 13.

The angular position of support bracket 200 relative to drive assembly 102 determines the status of control valve 196, as is best shown in FIGS. 13 and 14. FIGS. 13 and 14 show a motor control linkage 235 forming an actuator element that senses this angular position and alters the position of plunger 236 thereby changing the control valve 196 status.

In the embodiment of FIGS. 13 and 14, linkage 235 comprises an actuator arm 244 attached by pivot 247 to the upper surface of deck 162. Arm 244 controls the position of plunger 236 by swinging a small angular amount either counterclockwise or clockwise as shown in FIGS. 13 and 14 respectively. A projection 250 fixedly mounted on side wall 201 of bracket 200 controls the position of arm 244 according to the angular position of bracket 200 relative to drive assembly 102. Projection 250 serves as a cam and actuator arm 244 serves as the cooperating cam follower.

As cutter unit 101 is raised and lowered by the support vehicle, bracket 200 rotates with respect to drive assembly 102. FIGS. 10 and 13 correspond to the operating position for cutter unit 101. Projection 250 is near to drive assembly 102 when cutter unit 101 is in the lowered position of FIG. 10. When in this position, linkage 235 presses plunger 236 into the body of valve 196 and motor 123 operates.

FIGS. 11 and 14 correspond to the raised position for cutter unit 101 in FIG. 12. FIG. 13 shows projection 250 When plunger 236 is pushed into valve 196 by linkage 235, the pressure difference between hoses 224 causes valve 227 to block flow of pressurized hydraulic fluid to motor 123 and blade 110 does not rotate.

One further safety concern for cutter unit 101 involves the momentum in blade 110 when valve 227 halts flow of pressurized hydraulic fluid to motor 123. This momentum may keep blade 110 spinning for an unacceptably long time after removing power. Ideally, power blade 110 should stop spinning within 7 sec. after cutter unit 101 has been raised. This corresponds approximately to the minimum time that may elapse from when an operator lifts cutter unit 101 to when he or she may be able to approach the blade area under deck 162.

At the same time, blade 110 should not stop in less than say 1-4 sec., because sudden "slamming on the brakes" so to say, has the potential to damage motor 123 and the hydraulic fluid system. This is because blade 110 is quite large and heavy and spins at quite high speed. Slowing blade 110 over the course of 4-7 sec. is preferable Motor valve 227 incorporates a soft stop modality that relies on diverting fluid flow through motor 123 through an orifice within valve 227. The fluid flow through the orifice uses the ability of motor 123 to function briefly as a pump to resist flow of hydraulic fluid and provide soft stop operation of motor 123.

FIG. 15 shows an alternative shape of a cylindrical roller 210' for supporting cutter unit 101. Roller 210' includes shafts 206 as before for support and rotation and conical ends 255. Roller 210' further includes a central section having at least one tapered (frustro-conical) portions 258. Preferably, the central section includes two frustro-conical surfaces 258, each diminishing in diameter toward the adjacent end of roller 210'.

The geometric definition of "cylinder" means simply a surface generated by rotating a line around an axis and at a constant distance from the axis. Thus, the term "cylinder" in this context include rollers having frustro-conical as well as straight-sided central sections.

The invention claimed is:

1. A cutter unit of the type to be moved along the ground for cutting vegetation, and to be carried by a vehicle having at least one vertically movable lift arm with an attachment point that can under power be placed in both a raised and a lowered position relative to the ground, said cutter unit having a housing having at least one of front and rear ends, said cutter unit further comprising:

a) a lifting bracket on the housing at a point spaced from the center of gravity and for connection to the attachment point on the lift arm, said lift arm attachment point and lifting bracket cooperating to allow lifting of the cutter unit from the ground; and b) a longitudinal roller mounted for rotation about an axis extending generally from the rear end of the housing to the front end of the housing, said roller forming at least a part of a side of the housing;

c) wherein at least one end of the roller is tapered; and d) wherein a central portion of the roller adjacent to the tapered end has a frusto-conical surface.

2. The cutter unit of claim 1, wherein the central portion of the roller adjacent to the tapered end has two frusto-conical surfaces, each diminishing in diameter toward the adjacent roller end.

3. The cutter unit of claim 1, wherein the surface of the central portion of the roller has an angle with respect to the axis of rotation that is smaller than the outer surface of the roller's tapered end.

* * * * *